(12) United States Patent
Li

(10) Patent No.: US 11,543,088 B1
(45) Date of Patent: Jan. 3, 2023

(54) PORTABLE LIGHTING DEVICE

(71) Applicant: Wenjie Li, Guangdong (CN)

(72) Inventor: Wenjie Li, Guangdong (CN)

( * ) Notice: Subject to any disclaimer, the term of this patent is extended or adjusted under 35 U.S.C. 154(b) by 0 days.

(21) Appl. No.: 17/679,488

(22) Filed: Feb. 24, 2022

(30) Foreign Application Priority Data

Aug. 27, 2021 (CN) .......................... 202110998288.6

(51) Int. Cl.
| | |
|---|---|
| *F21L 14/02* | (2006.01) |
| *F21V 9/40* | (2018.01) |
| *F21V 8/00* | (2006.01) |
| *F21Y 115/10* | (2016.01) |

(52) U.S. Cl.
CPC ................ *F21L 14/02* (2013.01); *F21V 9/40* (2018.02); *G02B 6/0086* (2013.01); *F21Y 2115/10* (2016.08)

(58) Field of Classification Search
CPC .......... F21L 14/02; F21V 9/40; G02B 6/0086; F21Y 2115/10
See application file for complete search history.

(56) References Cited

U.S. PATENT DOCUMENTS

2021/0071825 A1   3/2021   Li

FOREIGN PATENT DOCUMENTS

| CN | 201568749 U | 9/2010 |
|---|---|---|
| CN | 204717374 U | 10/2015 |
| CN | 205938660 U | 2/2017 |

*Primary Examiner* — Mary Ellen Bowman
(74) *Attorney, Agent, or Firm* — Schmeiser, Olsen & Watts, LLP

(57) ABSTRACT

A portable lighting device including a shell, at least one luminous element, a lens component, a battery compartment, positive and negative terminals, at least one indicator mark disposed on the battery compartment, and light-transmitting channels is provided. The battery compartment is made of transparent and fluorescent materials. The indicator mark is used for indicating the positive or negative terminals. The light-transmitting channels allow the light emitted by the luminous element to irradiate and stimulate the battery compartment to emit light and exhibit an afterglow. Thus, by using the light from the battery compartment to illuminate the indication mark, the user can accurately determine the positive and negative terminals in the battery compartment in a dark environment, which is convenient to replace batteries or battery pack.

20 Claims, 6 Drawing Sheets

PORTABLE LIGHTING DEVICE

CROSS REFERENCE TO RELATED APPLICATIONS

This application claims priority to Chinese Application No. CN 202110998288.6 having a filing date of Aug. 27, 2021, the entire contents of which are hereby incorporated by reference.

FIELD OF TECHNOLOGY

The following relates to the technical field of lighting equipment, in particular to a portable lighting device.

BACKGROUND

Portable lighting devices include hand-held flashlights, headlamps worn on the head with headbands and so on, which can be carried about by individuals, and are widely used for outdoor activities, field explorations, underground operations and other scenes.

Conventional portable lighting devices generally use replaceable batteries as power sources to facilitate replacement when the battery is depleted. The commonly used batteries include alkaline batteries, cadmium nickel batteries and lithium batteries. However, no matter what kind of battery is used, the positive and negative electrodes of the battery should be placed corresponding to the positive and negative contact terminals of the battery compartment during installation. Considering that lighting devices are often used in a dim or even no light environment, and for some headlamps or large flashlights, the positive and negative terminals inside the battery compartment are difficult to distinguish in the dark environment, therefore when changing batteries, it is hard to accurately find the positive and negative terminals inside the battery compartment, which makes it difficult to install batteries.

SUMMARY

An aspect relates to a portable lighting device that helps users to accurately identify positive and negative terminals in a battery compartment, providing quick and easy batteries or battery pack replacement.

The portable lighting device includes a shell, at least one luminous element, a lens component, a battery compartment, at least one positive terminal, at least one negative terminal, at least one indicator mark and a plurality of light-transmitting channels. The luminous element, the lens component and the battery compartment are disposed in the shell. The lens component is sleeved on a front side of the luminous element for collecting light emitted by the luminous element and guiding the light to an outside of the shell. The battery compartment is located at a rear side of the luminous element, and is made of transparent and fluorescent materials, including a base plate and at least one side wall. The positive and negative terminals are disposed in the battery compartment, and configured to be electrically connected to the luminous element, respectively. The indicator mark is disposed on the base plate of the battery compartment, for indicating where the positive terminal and/or the negative terminal are. The light-transmitting channels are configured to allow the light emitted by the luminous element to irradiate the base plate of the battery compartment to stimulate the base plate to emit light and exhibit an afterglow.

In some embodiments, the portable lighting device further includes a plurality of light-guide columns, which are respectively arranged in the light-transmitting channels. And the light-guide column may be made of transparent and fluorescent materials.

The portable lighting device disclosed herein adopts the battery compartment made of transparent and fluorescent materials, on which the indicator mark is arranged, and the luminous element can irradiate the light to the battery compartment through the light-transmitting channels, or the light-guide columns are further provided to guide more light to the battery compartment, so that the indication mark becomes visible by using the fluorescent afterglow of the battery compartment under the condition of insufficient light to indicate the positive and/or negative terminals in the battery compartment.

This kind of lighting device solves the problem that it is difficult for users to accurately determine the positive and negative terminals within the battery compartment in a dark environment, which causes the inconvenience of replacing batteries or battery pack.

These and other features, aspects and advantages of embodiments of the present invention will become better understood with reference to the following drawings, description and claims.

BRIEF DESCRIPTION

Some of the embodiments will be described in detail, with reference to the following figures, wherein like designations denote like members, wherein FIG. 1 is a structural exploded view of a portable lighting device according to one or more embodiments;

DETAILED DESCRIPTION

Figure 1:
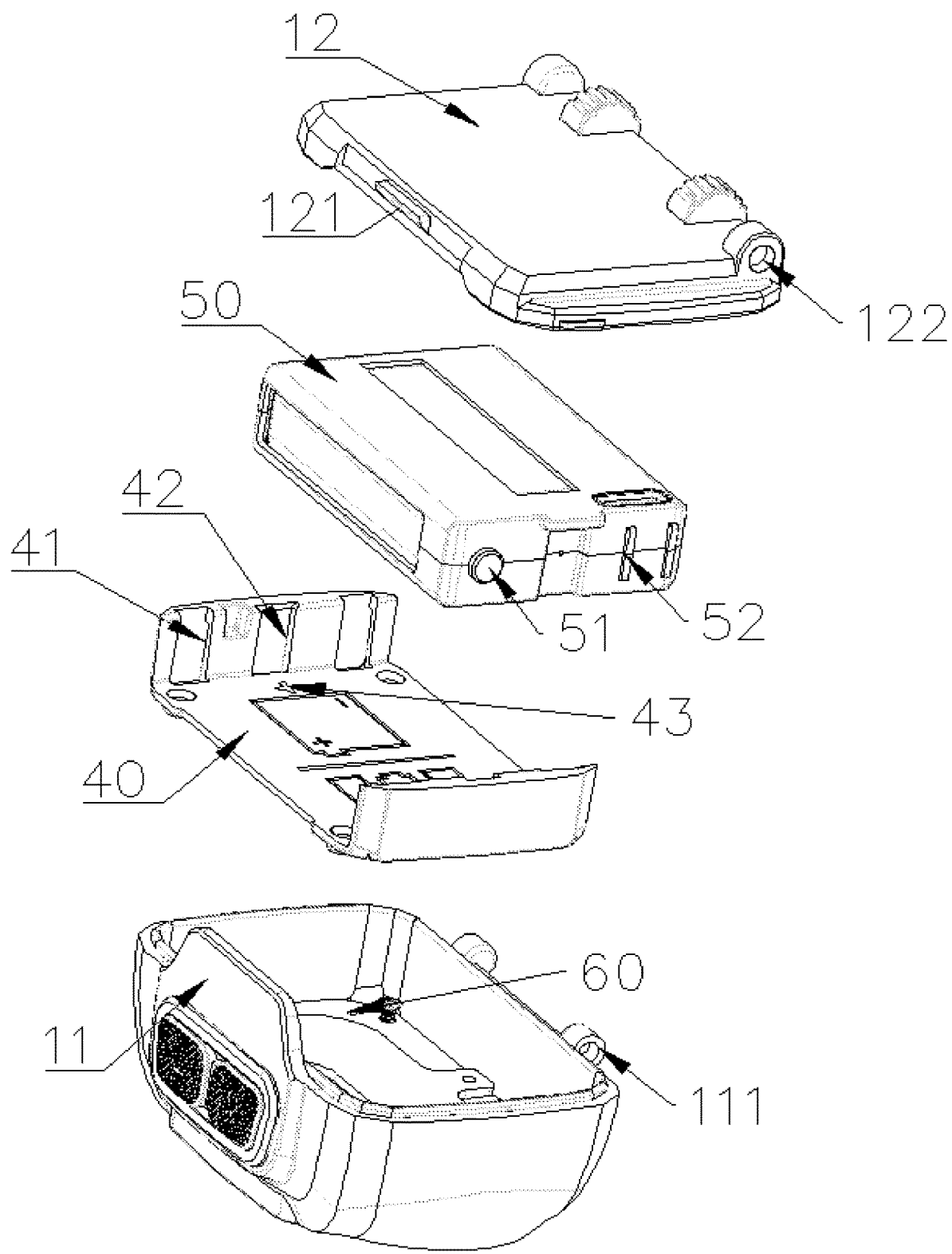

The present disclosure will be further described in detail below in combination with the accompanying drawings and embodiments. It can be understood that the specific embodiments described herein are only used to explain embodiments of the invention and not to limit embodiments of the invention. It should also be noted that for ease of description, only part but not all of the contents related to embodiments of the invention are shown in the drawings.

The terminology used herein is for the purpose of describing particular embodiments only and is not intended to be limiting of embodiments of the invention. As used herein, the term "above", "below", "front", "rear", "left", "right", "vertical", "horizontal", "top", "bottom", "inner" and "outer" indicates a location or position based on the orientation or positional relationship shown in the drawings, and is only for the convenience of description and simplification, rather than indicating or implying the device or element must have a specific orientation, be constructed and operated in a specific orientation.

It should be noted that when an element is referred to as being "fixed to" another element, it may be directly on the other element or intermediate element(s) may also exist between the two. When an element is considered to be "connected" to another element, it can be directly connected to the other element or intermediate element(s) may exist between the two at the same time.

Several specific embodiments are described below to introduce the technical solutions of the present application in detail. The following specific embodiments can be combined with each other, and the same or similar concepts or processes may not be repeated in some embodiments.

Referring to FIG. 1 to FIG. 4, the portable lighting device provided in some embodiments may be a headlamp, which includes a shell 10, a luminous element 20, a lens component 30, a battery compartment 40, a battery pack 50 housed in the battery compartment 40 and a PCB board 60 (PCB is the abbreviation of "Printed Circuit Board"), and the luminous element 20, the lens component 30, the battery compartment 40, the battery pack 50 and the PCB board 60 are all arranged in the shell 10. In some other embodiments, the portable lighting device may be a flashlight, a miner's lamp and so on.

The shell 10 includes a front shell body 11 and a rear shell body 12, in which the front shell body 11 is rotationally coupled to the rear shell body 12. In some embodiments, the front shell body 11 has a first pivoting portion 111 thereon, the rear shell body 12 has a second pivoting portion thereon (not shown), and the second pivoting portion engages with the first pivoting portion so that the front shell body 11 and the rear shell body 12 are able to pivot around the first pivoting portion 111 and the second pivoting portion. Specifically, the second pivoting portion is a rotating shaft, and the first pivoting portion 111 is a pair of shaft holes 111 for installing the rotating shaft, which are respectively arranged on both sides of the front shell body 11 as shown in FIG. 1.

In order to realize the locking of the front shell body 11 with the rear shell body 12, in some embodiments, the front shell body 11 is further provided with a first locking portion (not shown) thereon, and the rear shell body 12 is further provided with a second locking portion 121 thereon. The first locking portion and the second locking portion 121 are matched, so that the front shell body 11 and the rear shell body 12 are able to be buckled with each other and locked. Specifically, the second locking portion 121 is a convex latch 121 as shown in FIG. 1, and the first locking portion is a latch recess corresponding to the convex latch 121.

Figure 3:
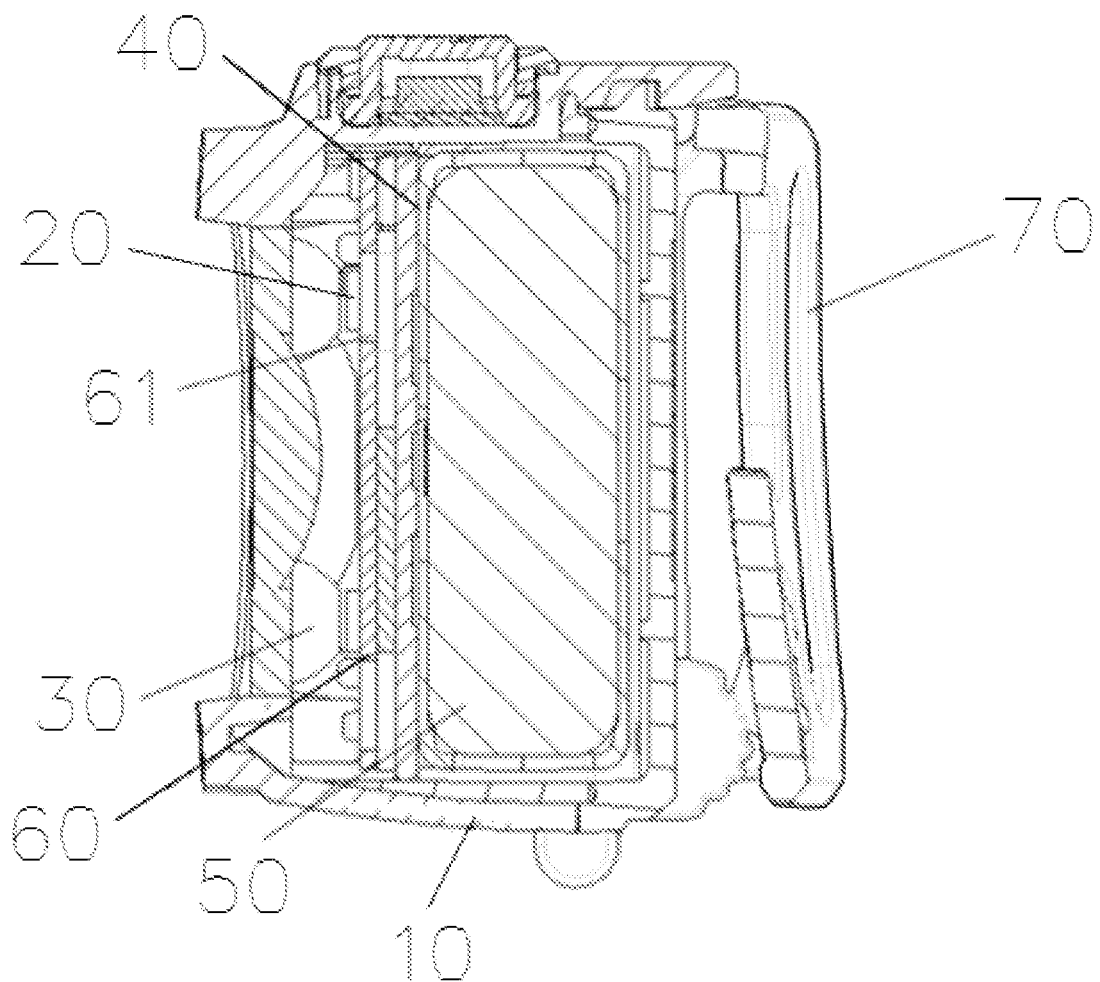
FIG. 3 is a cross-sectional view of a portable lighting device according to one or more embodiments.

As shown in FIG. 1 and FIG. 3, the PCB board 60, the luminous element 20, the lens component 30 and the battery compartment 40 are all positioned inside the front shell body 11. The opening of the battery compartment 40 faces the rear shell body 12, so that when the front shell body 11 is opened from the rear shell body 12 by rotating around the rotating shaft, the user can directly and conveniently replace the battery pack 50 from the opening of the battery compartment 40 without disassembling other parts in the shell 10. The battery compartment 40 includes a base plate 40a and at least one side wall 40b. The side wall 40b extends from the edge of the base plate 40a in a direction away from the luminous element 20, and is substantially perpendicular to the base plate 40a. The number of the side walls 40b can be two, the two side walls 40b are arranged opposite to each other, as shown in the drawings. In some embodiments, the battery compartment 40 can also receive other types of batteries, such as No. 5 battery, No. 7 battery, No. 9 battery, etc., for accommodating different types of batteries, the positive and negative terminals in the battery compartment 40 can be set according to the type of batteries.

As shown in FIG. 3, the PCB board 60 divides the space inside the front shell body 11 into two sides, in which one side of PCB board 60 is a first side inside the front shell body 11, where the luminous element 20 is positioned. The lens component 30 is sleeved on the outer periphery of the front side of the luminous element 20. The number of luminous element 20 can be one or more. In FIG. 3, the number of the luminous elements 20 is two for illustration. In some embodiments, the luminous element 20 is an LED light source 20 (LED is the abbreviation of "Light Emitting Diode"). Most light emitted by the luminous element 20 is transmitted by the lens component 30 and then passes through the front shell body 11 to illuminate outside space.

Figure 2:
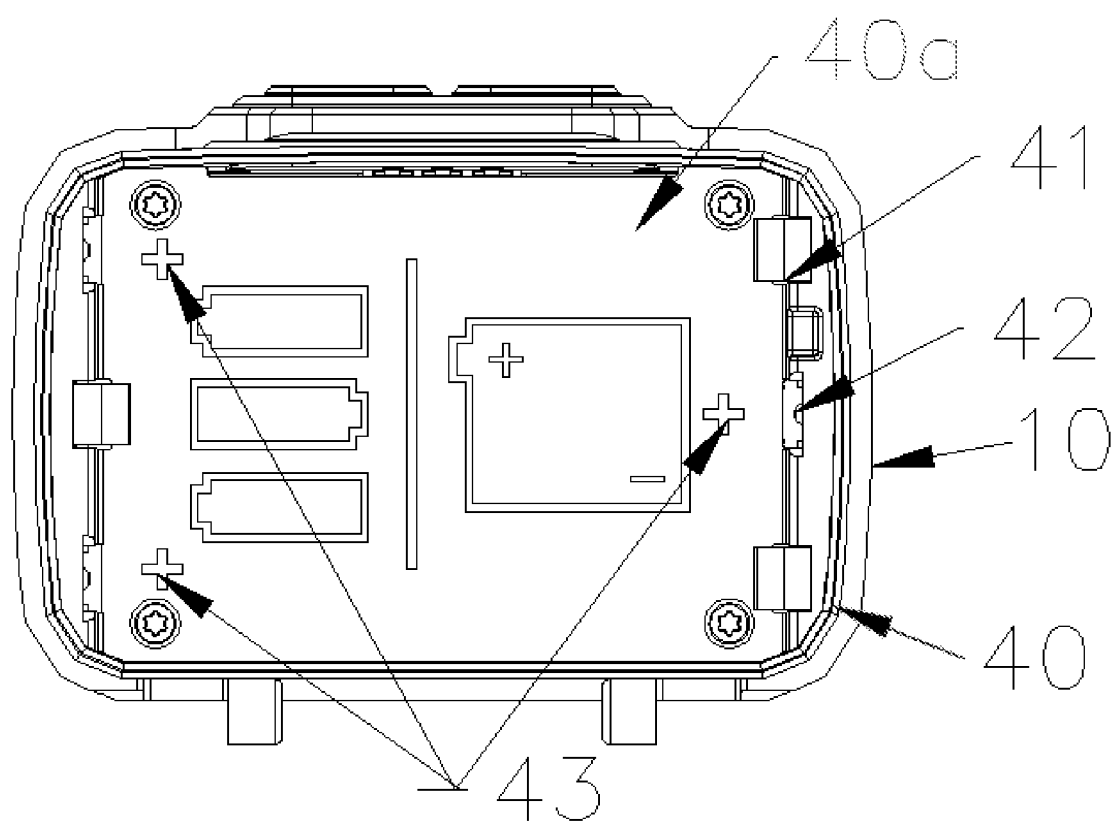
FIG. 2 is an internal schematic diagram of a battery compartment of a portable lighting device according to one or more embodiments.

The other side of the PCB board 60 is a second side inside the front shell body 11, where the battery compartment 40 is positioned, that is, the battery compartment 40 is located at the rear side of the luminous element 20. As the example shown in FIG. 2, a whole battery pack 50 or three dry batteries can be placed in the battery compartment 40, and the base plate 40a of the battery compartment 40 are marked with the placement directions of the battery pack 50 and the dry batteries, as well as the placement positions of its/their positive and negative electrodes. A plurality of negative terminals 41 and positive terminals 42 are arranged in the battery compartment 40, which are used for contacting the negative electrode 52 and the positive electrode 51 of the battery pack 50 respectively, or the positive and negative electrodes of the dry batteries. The negative terminals 41 and the positive terminals 42 transmit the power supplied by the battery pack 50 or the dry batteries to the luminous element 20 via the power supplying circuit of the PCB board 60, so that the luminous element 20 emits light. The negative terminals 41 and the positive terminals 42 may be arranged on the side walls 40b, as shown in FIG. 2.

A plurality of light-transmitting channels are also arranged on the PCB board 60. In some embodiments, the light transmitting channels are through holes 61 penetrating the PCB board 60, which connects the spaces on both sides of the PCB board 60. The through holes 61 allow the remaining light, behind the lens components 30, that couldn't travel through the lens components 30, to be reflected to the second side of the front shell body, that is, toward the battery compartment 40, onto a designated area on the outside of the base plate 40a of the battery compartment 40, the designated area in this specification is the design area of the base plate that can be exposed to the residual light from the luminous element, for illuminating indication marks in the dark. In embodiments, the battery compartment 40 is made of transparent and fluorescent materials, specifically is made of a mixture of a transparent material and a fluorescent material, which, are polycarbonate and phosphor powder, respectively. Since the battery compartment 40 is fabricated using transparent and fluorescent materials, both sides of the designated area on the base plate 40a of the battery compartment 40 are able to glow and exhibit an afterglow in the dark.

In order to guide the user to replace the battery pack or dry batteries in a dark environment with the light from the designated area, the defined area is provided with indication marks. In the example shown by FIG. 2, the inner side of the base plate 40a corresponding to the designated area is provided with indication marks 43, the indication marks 43 are used to indicate the positive and/or negative terminals, and the indication marks 43 in FIG. 2 are positive symbols for illustration. In other embodiments, the indication marks 43 may be configured as marks indicating the negative terminals, or marks indicating both the negative and positive terminals at the same time. In the example of FIG. 2, there are three indication marks 43, which are used to indicate the positive terminals 42 for contacting the positive electrodes of the dry batteries. In some embodiments, the indication marks 43 can be configured in other areas to indicate the negative terminals 41 for contacting the negative electrodes of the dry batteries, or to indicate the positive and negative terminals for contacting the positive and negative electrodes of the battery pack.

Figure 4:
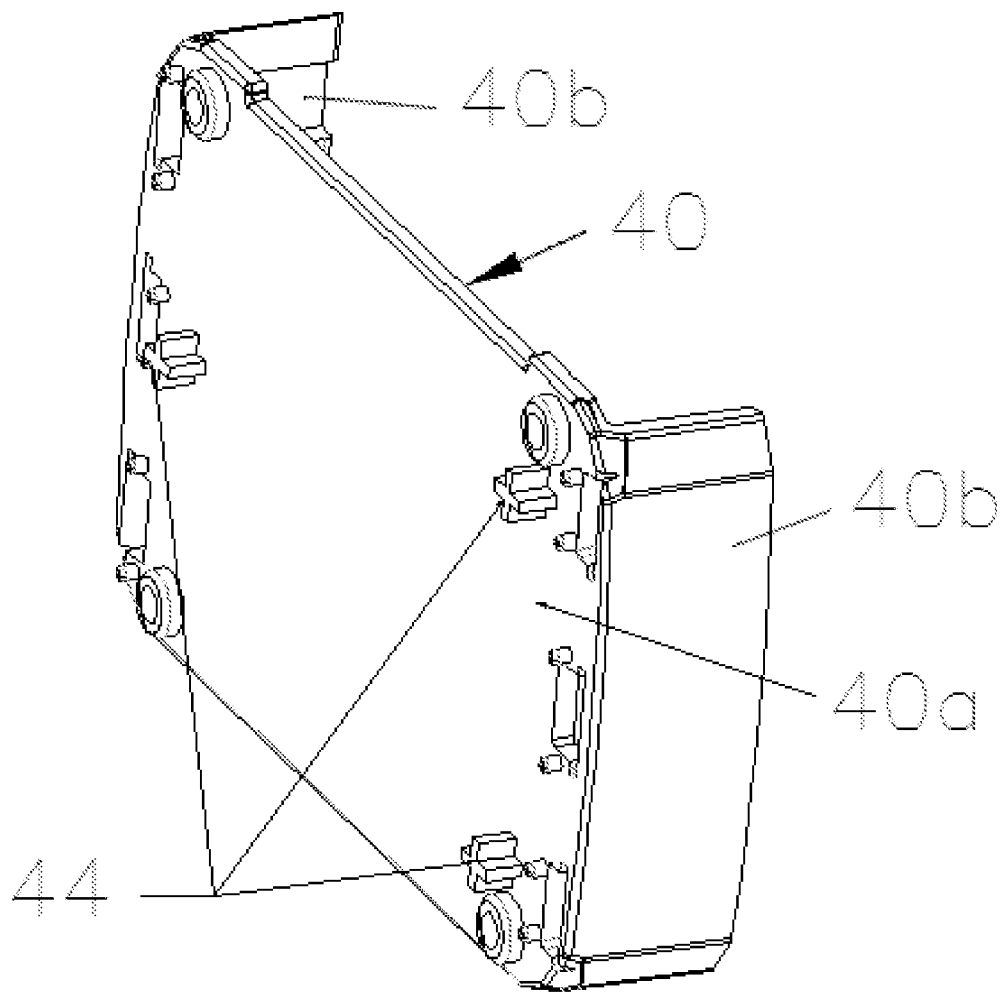
FIG. 4 is a schematic structural view of a battery compartment of a portable lighting device according to one or more embodiments.

In some embodiments, as shown in FIG. 4, the base plate 40a of the battery compartment 40 is further provided with light-guide columns 44 thereon. The light-guide columns 44 are disposed in the designated area of the outside of the battery compartment 40, and the ends of the light-guide columns 44 extend towards the direction of the through holes 61. The light-guide columns 44 are made of transparent and fluorescent materials, polycarbonate and phosphor powder respectively. The light-guide column 44 has a good light-gathering property to increase the light irradiated on the indication marks 43, so as to increase the luminous intensity of the indication marks 43. In other embodiments, the light-guide columns 44 can be made of other light-gathering or light-guiding material.

Figure 5:
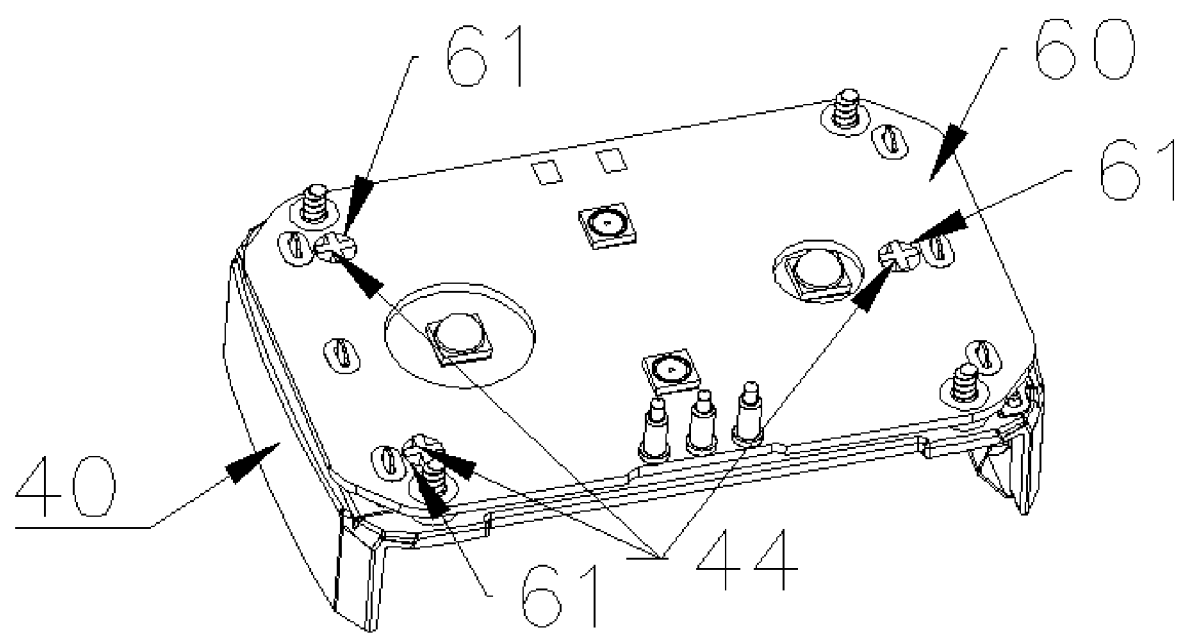
FIG. 5 is a schematic view of a PCB board of a portable lighting device according to one or more embodiments.

In some embodiments, as shown in FIG. 4 and FIG. 5, the radial section of the light-guide column 44 is a positive symbol with the same shape as that of the indication mark 43, the light-guide column 44 penetrates the through hole 61 and protrudes from the front side of the PCB board 60, thus achieving better light guiding effect. Combined with FIG. 2, the light-guide column 44 is formed by extending from the position of the indication mark 43 on the base plate 40a toward the luminous elements 20.

In some embodiments, the light-guide columns 44 and the battery compartment 40 are fabricated in one piece using injection molding, specifically with transparent and fluorescent materials.

Figure 6:
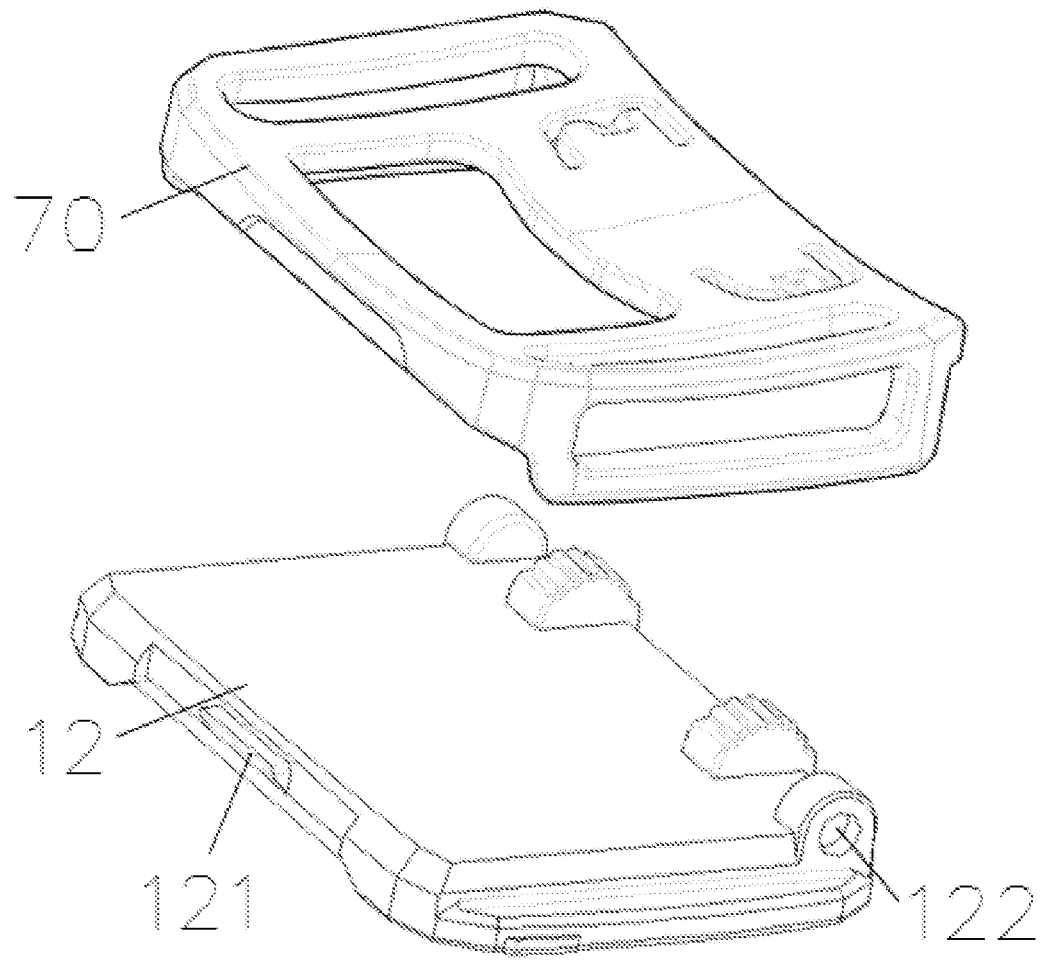
FIG. 6 is a schematic view of a rear shell and a bracket of a portable lighting device according to according to one or more embodiments.

In some embodiments as shown in FIG. 1, FIG. 3, and FIG. 6, the portable lighting device further includes a bracket 70, the rear shell body 12 is provided with a shaft hole 122 thereon, and a rotating shaft (not shown) corresponding to the shaft hole 122 is arranged on the bracket 70, so that the bracket 70 can be fixed on the rear shell body 12 by installing the rotating shaft in the shaft hole 122.

An embodiment of the portable lighting device operates as the following:

When the luminous elements 20 emit light, the majority of the light rays travels through the lens components 30 and to the outside environment, while the remaining light behind the lens component 30 is reflected, through the through holes 61, toward the battery compartment 40 and onto the designated area of the battery compartment 40 made of fluorescent and transparent materials; alternatively, the light-guide columns 44 gather the remaining light toward the designated area. When changing the battery pack 50 or dry batteries, the indication marks 43 in the designated area used for indicating the correct placement positions of its/their positive and negative electrodes, are capable of glowing after being exposed to light, in addition to the previously stated features that the cross-section areas of the light-guide columns 44 are shaped the same as the indication marks 43, allowing the user to accurately locate the positive terminals 41 and the negative terminals 42 of the battery compartment 40 in the dark, and therefore offering a convenient way to replace the battery pack or dry batteries.

In the portable lighting device disclosed herein, the battery compartment is made of transparent and fluorescent materials, and the indication marks for battery polarity are arranged on the battery compartment. The indication marks can be irradiated by the light from the luminous elements through the light transmitting channels, or by the light concentrated by the light-guide columns, so that the indication marks can emit light due to afterglow phenomenon of fluorescence even under insufficient environmental light, and thereby to indicate the positive or negative terminals of the battery compartment, further allowing the user to more precisely identify the positive or negative terminals of the battery compartment with the help of the light-guide columns whose cross-sections are shaped the same as that of the positive or negative symbols. The portable lighting device enables users to accurately identify the positive and negative terminals of the battery compartment in the dark, and to therefore easily replace batteries or battery pack.

Reference numerals in the Figures: 10-shell, 11-front shell body, 111-first pivoting portion, 12-rear shell body, 121-second locking portion, 122-shaft hole, 20-luminous element, 30-lens component, 40-battery compartment, 40a-base plate, 40b-side wall, 41-negative terminal, 42-positive terminal, 43-indication mark, 44-light-guide column, 50-battery pack, 51-positive electrode of battery pack, 52-negative electrode of battery pack, 60-PCB board, 61-through hole, 70-bracket.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality.

The invention claimed is:

1. A portable lighting device, comprising:
    a shell;
    at least one luminous element disposed in the shell;
    a lens component, disposed in the shell and sleeved on a front side of the luminous element for collecting light emitted by the luminous element and guiding the light to an outside of the shell;
    a battery compartment, disposed in the shell and located at a rear side of the luminous element, made of transparent and fluorescent materials, comprising:
    a base plate; and
    at least one side wall, extending from an edge of the base plate in a direction away from the luminous element;
    at least one positive terminal and at least one negative terminal, disposed in the battery compartment, and configured to be electrically connected to the luminous element, respectively;
    at least one indicator mark, disposed on the base plate of the battery compartment, for indicating the positive terminal and/or the negative terminal; and
    a plurality of light-transmitting channels, configured to allow the light emitted by the luminous element to irradiate the base plate of the battery compartment to stimulate the base plate to emit light and exhibit an afterglow.

2. The lighting device of claim 1, further comprising a plurality of light-guide columns respectively arranged in the light-transmitting channels.

3. The lighting device of claim 2, wherein the light-guide column is made of transparent and fluorescent materials.

4. The lighting device of claim 3, wherein the transparent material is polycarbonate, and the fluorescent material is phosphor.

5. The lighting device of claim 2, wherein the light-guide column is formed on the base plate of the battery compartment to extend along the light-transmitting channel and is integrally formed with the battery compartment.

6. The lighting device of claim 2, wherein the light-guide column is formed on the base plate to extend from a position of the indicator mark toward the luminous element.

7. The lighting device of claim 2, wherein a shape of the radial cross section of the light-guide column is the same as a shape of the indicator mark.

8. The lighting device of claim 1, wherein the indicator mark is selected from a positive symbol or a negative symbol.

9. The lighting device of claim 1, further comprising a PCB board, disposed in the shell and located between the luminous element and the base plate of the battery compartment, wherein the positive and negative terminals are respectively electrically connected to the luminous element through the PCB board, and the light-transmitting channel is a through hole penetrating the PCB board.

10. The lighting device of claim 9, further comprising a plurality of light-guide columns respectively arranged in the light-transmitting channels.

11. The lighting device of claim 10, wherein the light-guide column is made of transparent and fluorescent materials.

12. The lighting device of claim 11, wherein the transparent material is polycarbonate, and the fluorescent material is phosphor.

13. The lighting device of claim 10, wherein the light-guide column is formed on the base plate of the battery compartment to extend along the light-transmitting channel, and is integrally formed with the battery compartment.

14. The lighting device of claim 10, wherein the light-guide column is formed on the base plate to extend from a position of the indicator mark toward the luminous element.

15. The lighting device of claim 10, wherein a shape of the radial cross section of the light-guide column is the same as a shape of the indicator mark.

16. The lighting device of claim 1, wherein the shell is formed by detachably buckling a front shell body and a rear shell body, and the front shell body is pivotally connected with the rear shell body.

17. The lighting device of claim 16, wherein the luminous element, the lens component and the battery compartment are arranged in the front shell body, and the side wall of the battery compartment extends from the base plate toward the rear shell body.

18. The lighting device of claim 16, further comprising a bracket disposed outside the shell and pivotally attached to the rear shell body.

19. The lighting device of claim 1, wherein the luminous element is an LED light source.

20. The lighting device of claim 1, wherein the lighting device is a headlamp, a flashlight or a miner's lamp.

\* \* \* \* \*